Aug. 28, 1956 R. L. McILVAINE 2,760,244
MULLING AND AERATING MACHINE AND METHOD
Filed Oct. 2, 1951 2 Sheets-Sheet 1
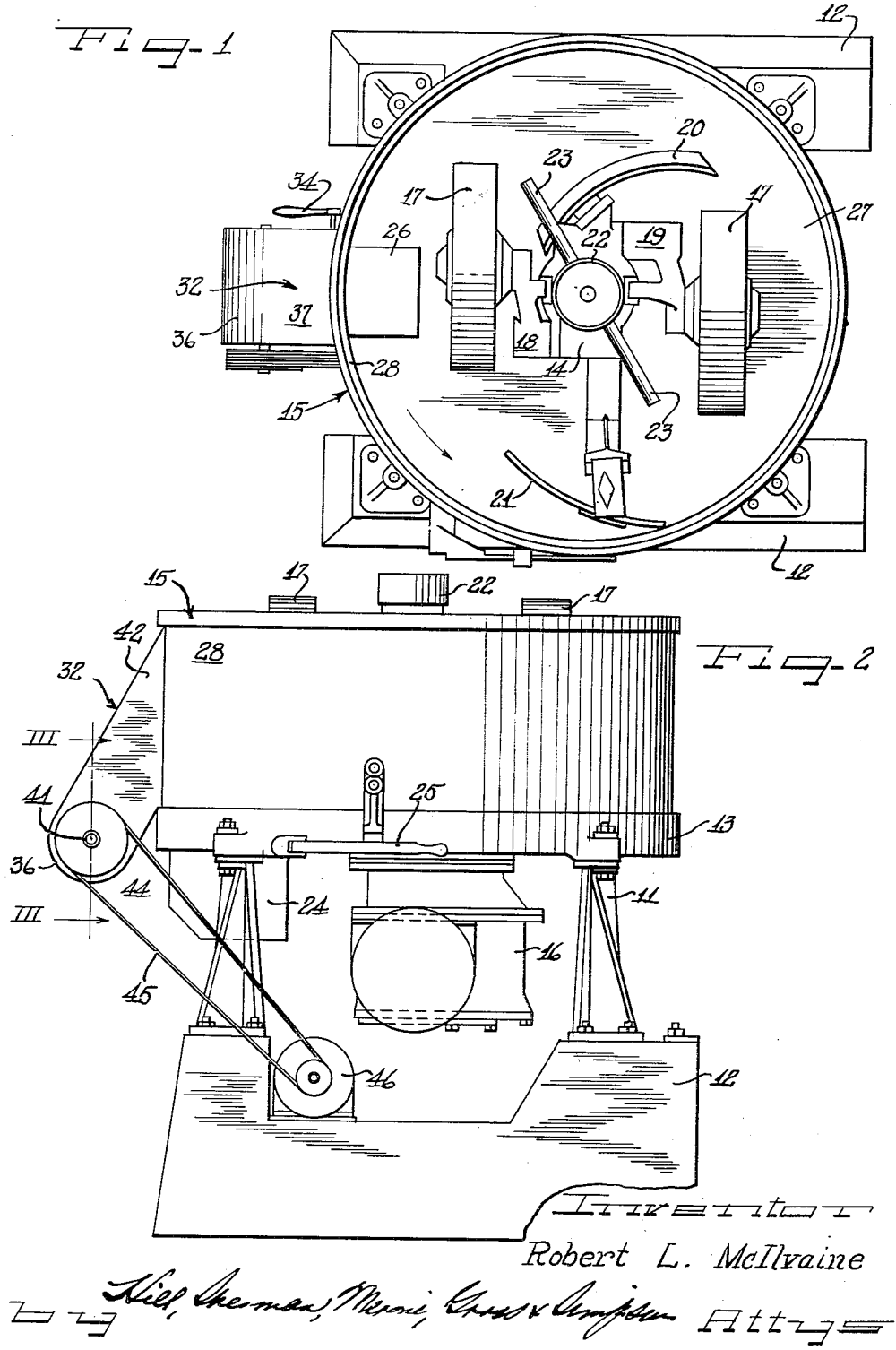
Inventor
Robert L. McIlvaine

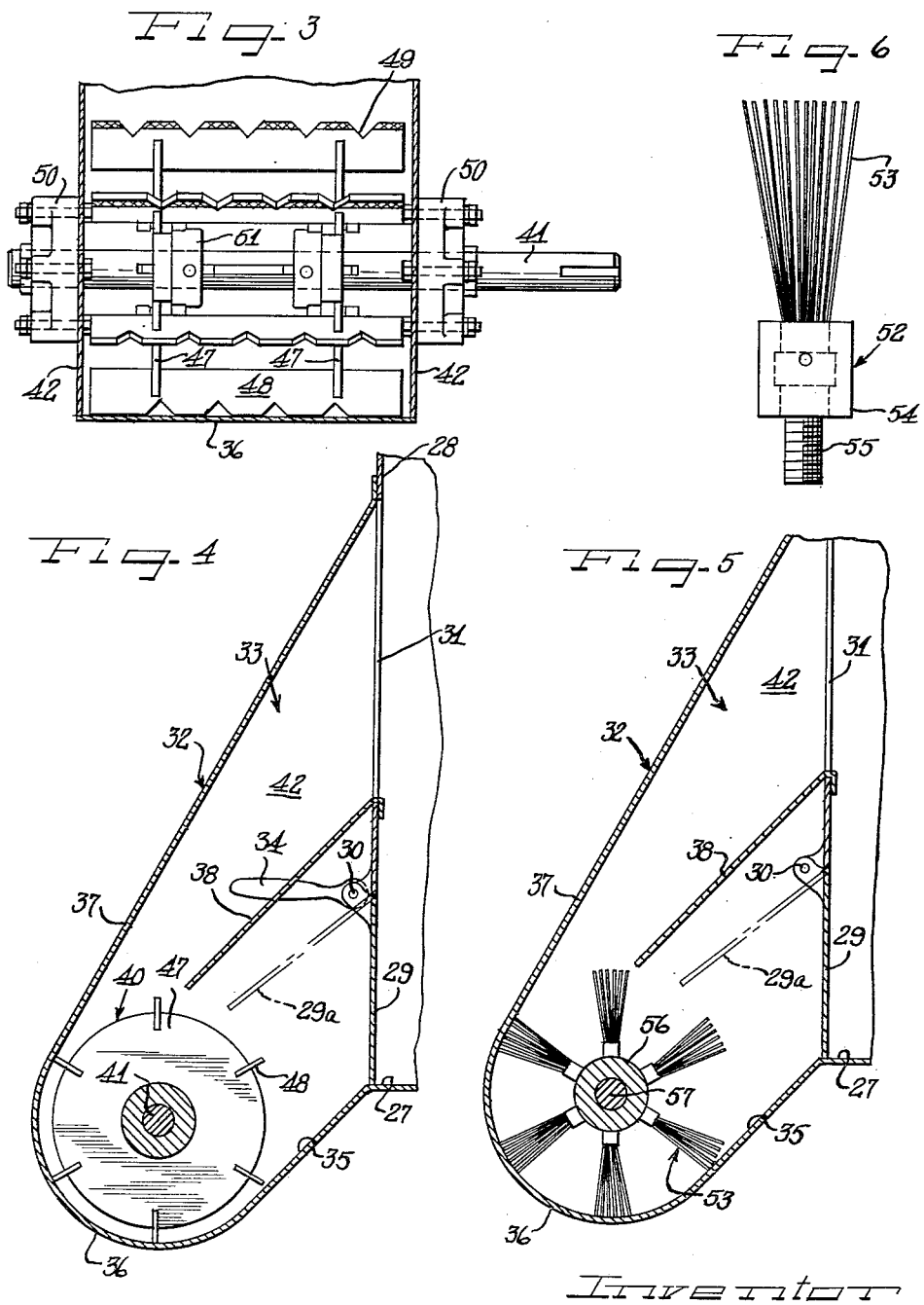

United States Patent Office 2,760,244
Patented Aug. 28, 1956

2,760,244

MULLING AND AERATING MACHINE AND METHOD

Robert L. McIlvaine, Chicago, Ill., assignor, by mesne assignments, to Herbert Simpson Corporation, Chicago, Ill., a corporation of Illinois Application October 2, 1951, Serial No. 249,354

6 Claims. (Cl. 22—89)

This invention relates to a mulling and aerating machine and more particularly to a machine for mulling and aerating foundry sand.

Heretofore mulling and aerating have not only been separate operations on a batch of material, but have been carried on independently and in succession in point of time. It has been established from a long study of molding technique that aeration and mulling are such different actions that separate parts should be utilized to perform each function. In existing machines, where the functions are performed separately, a batch of sand is mulled and after the completion of the mulling operation, the entire batch is discharged into an independent aerator. Inasmuch as the hourly production capacity of a mixer is directly proportional to the number of batches per hour, it is essential that the discharge time be cut to a minimum. This means that the aerator must handle the entire batch of sand in an exceedingly short time. In order to discharge a 3000 lb. batch in 30 seconds, an aerator would have to have a capacity of 180 tons of sand per hour. Furthermore, the conventional aerator must, of course, be mounted under the discharge of the mixer and above the receiving hopper or the like, and the aerator thus requires that there be additional height between the mixer discharge and the receiving hopper or conveying means.

To remedy these disadvantages, it is the proposal of the present invention to carry on mulling and aeration of a batch of sand at the same time, but at the same time maintaining the all essential separation of the mulling and aerating functions with respect to the individual particles of sand of the batch.

It is, therefore, an important object of the present invention to provide a mulling and aerating machine which will act on a given batch of material simultaneously while maintaining the mulling and aerating functions separate with respect to the individual particles of the batch.

It is another important object of the present invention to provide a novel method for mulling and aerating granular material.

It is another important object of the present invention to eliminate the necessity for an aerator between the discharge of a mulling machine and receiving hopper or conveying means.

It is a further object of the present invention to provide a method for aerating granular material.

It is a still further object of the present invention to provide a novel aerator for use in conjunction with a mulling machine and which will operate simultaneously with the muller on a given batch of material.

It is another object of the present invention to provide a novel aerator cage.

It is still another object of the present invention to provide a novel aerator which can act on a batch of material for a longer time without increasing the discharge time of a mixer associated therewith.

Other and further features, objects and advantages of the present invention will be apparent to one skilled in the art from the following detailed description of a preferred embodiment of the invention taken in connection with the accompanying drawings.

On the drawings:

Figure 1 is a top plan view of a mulling and aerating machine constructed in accordance with the present invention;

Figure 2 is a side elevational view of the machine of Figure 1;

Figure 3 is a vertical sectional view taken substantially along the line III—III of Figure 2;

Figure 4 is a partial longitudinal sectional view through an aerator constructed in accordance with the present invention;

Figure 5 is a view similar to Figure 4, but showing a modified form of aerator cage according to the present invention; and Figure 6 is a side elevational view of a brush assembly separated from the aerator cage shown in Figure 5.

As shown on the drawings:

As shown in Figures 1 and 2, the mulling and aerating machine is supported by four upstanding legs 11 mounted on support blocks 12. The bedplate 13 of the machine is bolted to the legs and is centrally apertured to receive therethrough the drive for the muller which drives the crosshead structure 14 within the muller basin 15. The drive housing 16 depends from the bedplate 12 centrally thereof. A pair of muller wheels 17 are pivotally connected to said cross-head 14 by means of arms 18 and 19, the arm 19 being radially longer than the arm 18. The cross-head 14 also mounts on inner plow 20 and an outer plow 21. A water funnel 22 is illustrated as mounted centrally of basin above the cross-head 14 and having a pair of branching pipes 23 extending outwardly from the funnel 22 for supplying water to a batch in the basin. A discharge chute 24 is illustrated as depending from the bedplate 12 and has a discharge lever 25 for controlling a door 26 which closes the opening into the chute. The basin has a bottom 27 and side wall 28 which together define a mulling chamber.

As the cross-head 14 rotates, with a batch of material in the mulling chamber, the muller wheels are rotated counterclockwise as seen in Figure 1. The outer plow 21 serves to scrape material from the outer periphery of the chamber inwardly into the path of the inner muller wheel 17, shown on the left in Figure 1, and the inner plow 20 serves to move material outwardly to the periphery of the mulling chamber and into the path of the outer muller wheel 17.

As seen in Figure 4, the muller chamber side wall 28 is provided with a door 29 pivotally mounted to the side wall 28, the door closing and opening adjacent the bottom 27 of the mulling chamber. A further opening 31 is in the side wall 28 and spaced above the door closed opening in substantially vertical alignment with the door closed opening. An aeration housing 32 is attached to the muller side wall 28 defining an aerating chamber 33 which is in communication with the mulling chamber through the opening 31 and through the door closed opening when the door is open, the open position of the door being indicated in dot-dash outline at 29a in Figure 4. The door may be actuated by a suitable lever 34. The housing includes a floor 35 extending downwardly from the bottom 27 of the muller chamber, a semi-cylindrical end wall 36 and a roof 37 extending upwardly to connect to the muller side wall 28 adjacent the upper margin of the opening 31. A baffle 38 is mounted in the side wall 28 and extends generally downwardly between the floor 35 and roof 37 into the aerating chamber 33, but terminating at a point spaced from the end wall 36 of the housing.

An aerating cage 40 is rotatably mounted on a shaft 41 adjacent the end wall 36 of the housing. The cage is of a length substantially equal to the separation between the side walls 42 of the housing so as to extend in close relation to the side walls. As shown in Figure 2, the shaft 41 is driven by means of a pulley 44 affixed to the shaft, a belt 45 and motor 46, which is mounted on one of the blocks 12.

One form of aerator cage is illustrated in Figures 3 and 4 and comprises a pair of spaced spiders 47 upon which are mounted in radial outward orientation and peripherally spaced around said spider a plurality of bars 48 having notches 49 therein, the notches in adjacent bars being staggered as shown in Figure 3. The shaft 41 rotates in bearings 50 mounted on the side walls 42 of the housing. The spiders are affixed to the shaft 41 by means of hubs 51.

In the modified form of the cage shown in Figures 5 and 6 individual brushes 52 comprise brush parts 53 and a holder 54 having a threaded stud 55 for threading into a hub 56 of a shaft 57. The brushes are preferably staggered in a manner similar to the notches shown in Figure 3. The remainder of the housing and the muller basin are identical and have been given the same reference numerals. The brushes 52 like the bars 48 preferably extend in close relation to the semi-cylindrical end wall 36 of the aerator housing 32.

The operation of the machine will now be readily understood. The door 29 in the side wall of the crib remains closed until all additions, including water, have have been made to the sand or other material being conditioned. The door 29 may then be opened and the sand is pushed or swirled by the inner plow 20 through the opening or inlet closed by the door adjacent the bottom of the crib. The delivery of sand to the aerating chamber is thus controlled by the pressure of sand swirling toward the inlet as the sand is being mulled in the mulling chamber. The material will then slide down the floor 35 of the aerator housing 32 toward the semi-cylindrical end 36 where it would be picked up by the bars 46, or brushes 53, of the aerator cage and thrown with considerable velocity back up through the housing above the baffle 38, through the opening 31 and into the mulling chamber of the machine. The opening 31 thus provides an outlet independent of the inlet closed by door 29 through which independent outlet aerated sand is returned to the mulling chamber above the level of the flow of sand swirling toward the inlet.

The machine thus permits aeration of the sand during the mulling cycle so that the period of aeration can be extended, for example, over several minutes rather than having to do the entire aerating job in 30 seconds or less. The discharge time of the mixing operation is not increased because of aeration, and no additional clearance is required in the preferred construction of the aerator housing.

The sand is aerated in close proximity to but in an area removed from the mulling chamber a slight distance so that the aerating chamber can be charged by material ejected from the mulling chamber solely by the normal pressure set up in the mulling chamber by the mulling operation.

The sand is centrifugally aerated in the inclined area 33 intersecting the side 28 of the mulling chamber at a multiple of superimposed points, at the juncture of the roof 37 with the side and at the juncture of the floor 35 with the side, defining a lower inlet and an upper outlet 31 for the aerating area.

The novel method of the present invention, which may be practiced with the use of the illustrated apparatus for mulling and aerating a batch of granular material comprises successively and sequentially subjecting portions of said batch to a mulling operation and to a centrifugal throwing operation. The centrifugal throwing operation of the present invention should be carefully distinguished from the impacting combing action of conventional aerators. In the present invention it is believed that the aeration takes place not so much as a result of impact as from the result of imparting to the granular particles a centrifugal velocity serving to separate lumps and aerate the particles.

It will be understood that modifications and variations may be effected without departing from the scope of the novel concepts of the present invention.

I claim as my invention:

1. In combination in a mulling and aerating machine, a stationary mulling basin having a bottom and side wall, said side wall having a first opening adjacent the bottom of said basin, a door for closing said opening, said side wall having a second opening spaced above said first opening, a housing outside of said basin and connected to said basin side wall and having a floor sloping downwardly from said first opening and a semi-cylindrical end at the lower end of said floor and an upwardly sloping roof extending to the side wall above said second opening, a baffle mounted on said side wall between said openings and extending generally downwardly between the floor and roof, but terminating spaced from the end of said housing, a generally cylindrical cage rotatably mounted in the housing adjacent the semi-cylindrical end thereof for receiving material from the floor of the housing and moving the material around the end of the housing and throwing it upwardly between the roof and baffle and through said second opening into the mulling basin.

2. In combination in a mulling and aerating machine, a mulling basin having a bottom and a side wall, said side wall having an opening therethrough, an aerator housing connected to said basin and in communication with said opening, means connected to said basin for admitting material from said basin into said housing, said aerator housing including a downwardly sloping floor for receiving material from said material admitting means and a semi-cylindrical end adjacent the lower end of said floor closing the bottom of said housing, a generally cylindrical cage rotatably mounted adjacent the cylindrical end of said housing and in close proximity with the floor and cylindrical end for picking up material from said floor and throwing it outwardly, and means for directing the thrown material back into said basin through said opening.

3. In combination in a mulling and aerating machine, a mulling basin defining a mulling chamber, an aerating housing defining an aerating chamber connected to said mulling basin, said mulling basin having a material inlet to said aerating chamber from said mulling chamber, and a material outlet from said aerating chamber to said mulling chamber, means defining a surface on which material is mulled in said mulling chamber, said aerator housing having means for receiving material from the inlet and disposed below the level of said mulling surface, and an aerator cage for rapid rotation in said aerator chamber and mounted adjacent the receiving means for throwing material received from said material inlet outwardly and upwardly through the material outlet and into the mulling chamber.

4. The method of mulling and aerating sand which includes delivering sand through an inlet from a mulling chamber to an adjacent aerating chamber by pressure of sand swirling generally horizontally toward the inlet and into the aerating chamber as the sand is being mulled in the mulling chamber and returning aerated sand through an independent outlet from the aerating chamber above the level of sand swirling toward the inlet of the aerating chamber.

5. In combination in a mulling and aerating machine, a stationary mulling basin having a bottom and side wall, said side wall having a first opening adjacent the bottom of said basin and a second opening spaced above said first opening, a housing outside of said basin and connected to said basin side wall and having a floor sloping downwardly from said first opening and a semi-cylindrical end at the lower end of said floor and an upwardly sloping roof extending to the side wall above said second opening, a generally cylindrical cage rotatably mounted in the housing adjacent the semi-cylindrical end thereof for receiving material from the floor of the housing and moving the material around the end of the housing and throwing it upwardly through said second opening into the mulling basin.

6. In combination in a mulling and aerating machine, a mulling basin having a bottom and a side wall, said side wall having an opening therethrough, an aerator housing connected to said basin and in communication with said opening, means connected to said basin for admitting material from said basin into said housing, said aerator housing including a floor portion for receiving material from said material admitting means and a lower end adjacent the lower end of said floor closing the bottom of said housing, a cage rotatably mounted adjacent the lower end of said housing and in close proximity with the floor and the lower end of the housing for picking up material from said floor and throwing it outwardly, said lower end of said housing being shaped to conform to said cage, and means for directing the material thrown outwardly by said cage back into said basin through said opening.

References Cited in the file of this patent

UNITED STATES PATENTS

| | | |
|---|---|---|
| 1,636,384 | Nicholls | July 19, 1927 |
| 1,676,663 | Nicholls | July 10, 1928 |
| 1,723,615 | Hamlin | Aug. 6, 1929 |
| 2,108,160 | Beaudry | Feb. 15, 1938 |
| 2,117,977 | Nicholls | May 17, 1938 |
| 2,546,679 | Rodges | Mar. 27, 1951 |

FOREIGN PATENTS

| | | |
|---|---|---|
| 541,407 | Germany | Jan. 11, 1932 |